United States Patent [19]
Voegele

[11] 4,178,929
[45] Dec. 18, 1979

[54] DOSING DEVICE FOR GERM-FREE MEASUREMENTS AND FILLING OF LIQUID MATERIAL

[75] Inventor: Guenther Voegele, Schönaich, Fed. Rep. of Germany

[73] Assignee: Robert Bosch GmbH, Stuttgart, Fed. Rep. of Germany

[21] Appl. No.: 862,314

[22] Filed: Dec. 20, 1977

[30] Foreign Application Priority Data

Dec. 22, 1976 [DE] Fed. Rep. of Germany ....... 2658147

[51] Int. Cl.² .............................................. A61J 7/00
[52] U.S. Cl. ................................. 128/213 R; 222/380; 222/383; 222/129; 222/152; 222/251; 222/282
[58] Field of Search ...................... 128/213, 272, 272.3, 128/273, 274, DIG. 28; 222/129, 152, 251, 282, 319, 335, 372, 373, 380, 382–385, 510

[56] References Cited

U.S. PATENT DOCUMENTS

| 3,213,903 | 10/1965 | Armstrong | 222/372 X |
| 3,850,345 | 11/1974 | Merritt | 222/380 X |
| 4,032,044 | 6/1977 | Flynn et al. | 222/380 X |

FOREIGN PATENT DOCUMENTS

| 1278869 | 11/1961 | France | 222/380 |
| 2071220 | 9/1971 | France | 222/380 |

*Primary Examiner*—E. H. Eickholt
*Attorney, Agent, or Firm*—Edwin E. Greigg

[57] ABSTRACT

A dosing device for germ-free measuring and filling of liquid material into containers. The dosing device has a dosing pump situated between a material supply chamber and a material filling chamber. In particular the pump has an extended chamber which permits freeing of the pump piston during sterilization. The supply chamber, the extended chamber and the filling chamber are interconnected by rigidly arranged channels, and the upper part of the supply chamber is connected through a further chamber of the pump to the filling chamber for placing these chambers in contact with a sterile atmosphere.

3 Claims, 4 Drawing Figures

DOSING DEVICE FOR GERM-FREE MEASUREMENTS AND FILLING OF LIQUID MATERIAL

BACKGROUND OF THE INVENTION

The invention encompasses a dosing device for germ-free measuring and filling of individual portions of liquid material through a dosing pump that is connected to a supply chamber and to a filling chamber, which dosing pump has an extended chamber to allow for freeing its dosing piston. In a known dosing device of this type, such as German Patent No. 21 63 097, connections are arranged on the supply chamber and on the extended chamber of the dosing pump through which a cleaning solution can be introduced to cleanse the parts of the device that come into contact with the filling material.

The dosing device following the invention claimed herein has the advantageous capability that a sterile gas may be introduced at a single location into one of several chambers to be kept sterile and a sterile atmosphere will be communicated to, and be maintained in, these chambers. A similar advantage is provided for cleaning the device in that, by introducing a cleaning solution through the filler material supply inlet of the supply container, all of these chambers can be cleaned.

OBJECT AND SUMMARY OF THE INVENTION

The object of the invention is to provide a dosing device arranged such that, during its operation, a sterile atmosphere can be maintained in the supply chamber above the filler material, in the extended chamber of the dosing pump, and in the filling chamber.

Another object is to provide a dosing device that can be easily cleaned.

The invention provides for a dosing device for liquid material which is arranged for pre-operation sterilization, maintenance of sterile conditions during operation, and easy cleaning. The dosing device includes a supply chamber, a dosing pump with an extended chamber for freeing its piston, a control valve, and a filling chamber which receives the container to be filled. To keep the parts which come into contact with the filling material germ-free, each chamber maintains a continually sterile atmosphere during operation.

BRIEF DESCRIPTION OF THE DRAWINGS

An exemplary embodiment of the invention is shown in the drawings, and is described in greater detail in the following description, in which.

DESCRIPTION OF THE PREFERRED EMBODIMENT

Figure 1:
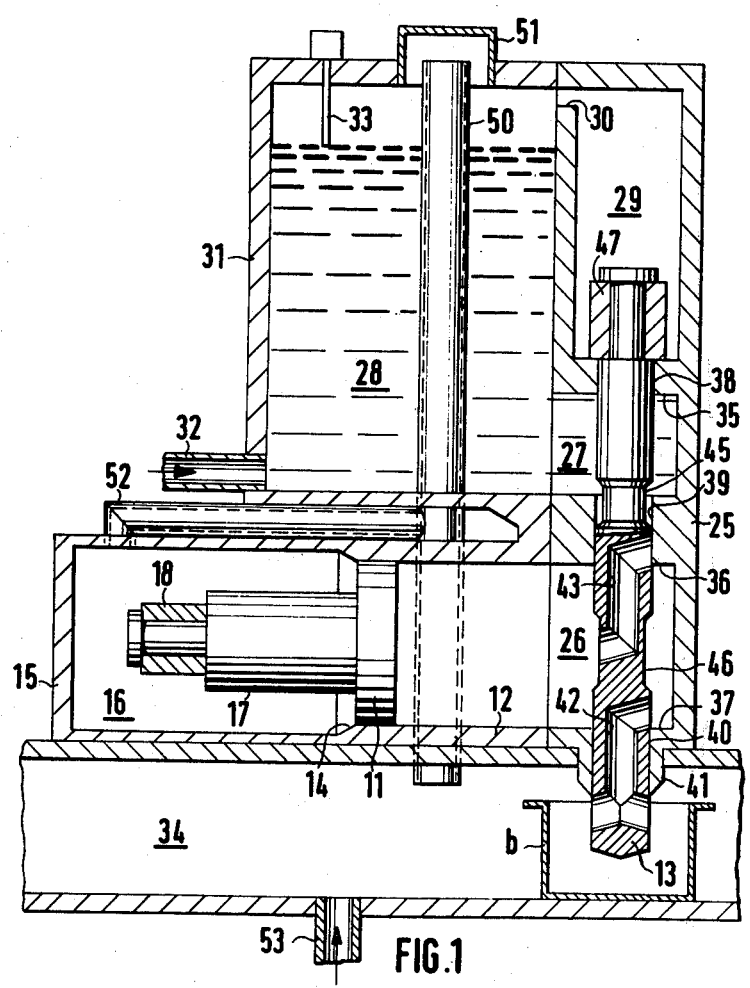
FIG. 1 illustrates a cross-sectional view of a dosing device in filling position.
Figure 3:
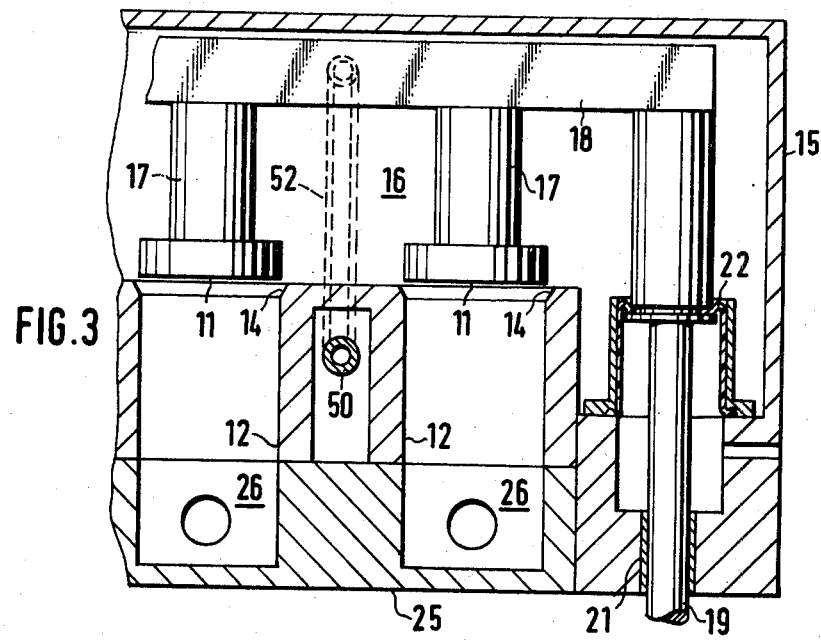
FIG. 3 shows the dosing pumps of the device according to FIG. 1 in longitudinal section along plane III—III of FIG. 2 on a smaller scale.

FIG. 1 shows a liquid dosing device provided with several, for example, four dosing pumps, which are arranged parallel to each other, each of which has a piston 11 in a horizontally arranged cylinder 12 and each has a movable distributing slide valve 13 arranged vertically thereto. On the side of the piston 11 opposite the distributing slide valve 13, a housing 15 is connected to each of the cylinders 12 by means of frusto-conical extensions 14, the housing 15 forming an enclosed extended chamber 16, into which the piston rods 17 of the pistons 11 project, and in which a movable shaft 18 is provided to carry the pistons 11 and their piston rods 17. The shaft 18 is attached to two rods 19 (shown in FIG. 3) which extend coplanar with the cylinders 12 into the chamber 16. The rods are provided with guide means 21 (shown in FIG. 3) in the wall of the housing 15 and are connected exteriorly of the housing 15 to suitably-adapted drive means to reciprocate the pistons 11. A flexible diaphragm 22 is attached at one of its extremities to the housing 15 and at its other extremity to the respective rod 19 to seal the guide means 21 of the rods 19.

The head chamber of the cylinder 12 adjoins a valve block 25 provided with two control chambers 26,27 for each distributing slide valve 13, in which the lower chamber 26 opens toward the head chamber of the cylinder 12 and the upper chamber 27 opens toward a filler material supply chamber 28. Additionally, the valve block 25 is provided with a third chamber 29, which communicates with the head chamber of the supply chamber 28 via an opening 30 adjacent to the upper extremity of a container 31. The supply chamber 28 is formed by a container shell 31 which abuts the valve block 25 and the housing 15. An inlet line 32 is provided in the container 31 adjacent to its juncture with the housing 15 to feed the filler material into the supply chamber 28. The level of the filler material supplied to chamber 28 is controlled by means of a level detector 33. There is provided, beneath the valve block 25 and the housing 15, a closed filling chamber 34 configured substantially in the form of a channel, into which containers b are led by means of sluiceways (not shown) and from which the containers b can then be removed after being filled and sealed.

Aligned bores are arranged in the walls 35,36 that separate the individual chambers 26,27 and 29 of the valve block 25 from each other, and in the wall 37 of the lower control chamber 26, which latter wall is provided with a co-axial extension and support 41. The circumferences of these bores operate together with the distributing slide valves 13 to form valve surfaces 38, 39, 40.

Figure 2:
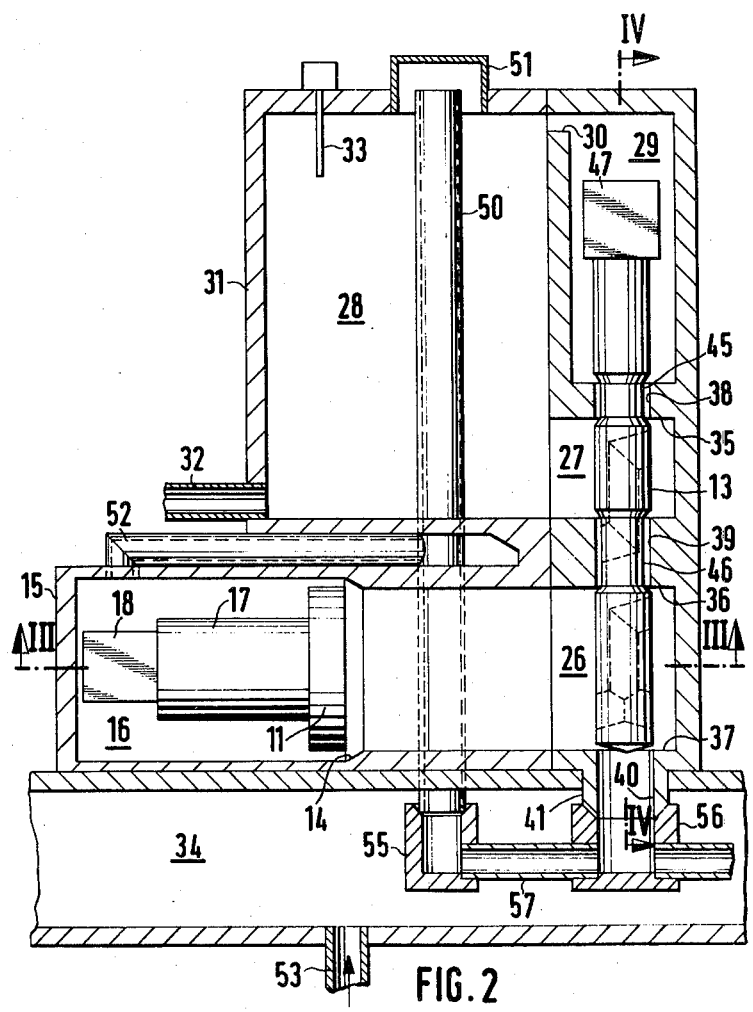
FIG. 2 shows in cross-sectional view the device according to FIG. 1 in sterilization position.

Each distributing slide valve 13 has two passage channels 42,43, one of which channels 42 connects the control chamber 26, which adjoins the dosing chamber of the cylinder 12, with the filling chamber 34, and the other of which channels 43 connects the control chamber 27, which adjoins the supply chamber 28, with the control chamber 26. In addition, each distributing slide valve 13 is provided with two constrictions 45,46, the axial separation of which constrictions equals the distance between the opposed separating walls 35 and 36 which form the top and bottom of the control chamber 27, and the length of each constriction is somewhat greater than the thickness of the adjacent separating walls 35,36, so that by upwardly positioning the distributing slide valve 13, the constrictions allow communication between the control chambers 26 and 27, and between the control chamber 27 and the upper chamber 29 of the valve block 25. This positioning is best shown in FIG. 2.

Figure 4:
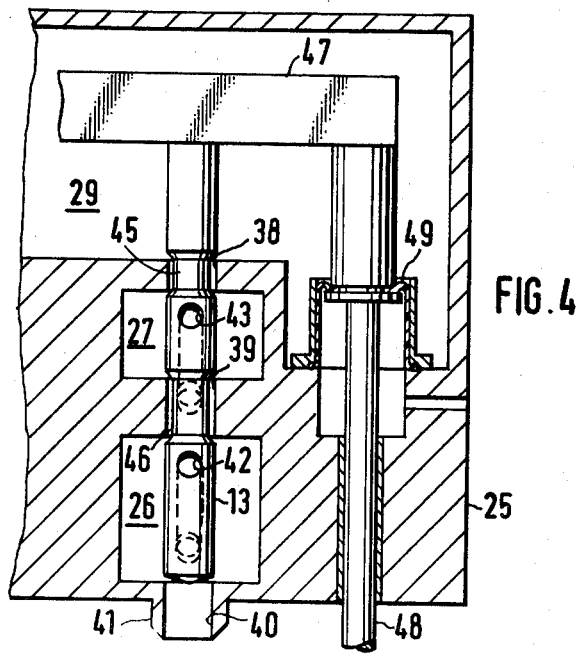
FIG. 4 illustrates a portion of the control valve of the device according to FIG. 1 in longitudinal section in the plane IV—IV of FIG. 2 on a smaller scale.

As best shown in FIG. 4, distributing slide valve 13 projects into the upper chamber 29 of the control block 25 and there a crossbar 47, which is carried upon two shafts 48 which project into the chamber 29 from the valve blocks 25. These shafts 48 can be reciprocated through a suitable drive means, which is controlled in such a manner, along with that for the reciprocal movement of the piston during the filling operation, that each distributing slide valve 13 assumes a medial position of travel during the suction movement of the pistons 11, and assumes a downward seated position during the expulsion movement of the pistons 11 (the latter of which positions is shown in FIG. 1). The rods 48 are sealed in a manner similar to that of the bars 19 by means of flexible diaphragms 49.

The contaminated air chambers of the device, namely, the filling chamber 34, the extended chamber 16, the chamber 29 and the head chamber of the supply chamber 28 are evacuated by germ-free air under a slight positive pressure, as compared to that of ambient air, so that no germs can contaminate the material supplied for portion filling, such as milk or a milk product, during the dosing and filling of previously sterilized filler material. To simplify the supply of germ-free air to all of these chambers and to equalize the pressure to each of them, all of these chambers are interconnected by fixed lines. The upper end of vertical tube 50 projects into the head chamber of the supply chamber 28 and into an extension cap 51, and penetrates the floor of the container 31 and into housing 15 while remaining sealed throughout at each juncture with a wall its lower extremity projects into the filling chamber 34. A curved tube 52 is connected to the vertical tube 50 and arranged to extend along the housing 15 to an inlet with the extended chamber 16. As previously mentioned, the head chamber of the supply chamber 28 is connected with the chamber 29 via an inlet 30. Sterilized air is supplied to these chambers 16, 28, 29, and 34 through a line 53 which enters the filling chamber 34 from beneath it.

Prior to placing the device in operation, all interior surfaces of the device are rinsed with a cleaning solution, then sterilized with steam, and finally pressurized by sterile air. To accomplish this purpose, the pistons 11 are retracted from the cylinders 12 into the extended chamber 16 (FIG. 3), and the distributing slide valves 13 are elevated to an uppermost position (FIG. 4) so that the bores of the pistons 11 and the guide bores of the distributing slide valves 13 are clear of obstruction. Thereupon, outflow supports 55,56 and an outflow line 57 are brought into alignment with the lower extremities of the tube 50 and the support 41, respectively, as shown in FIG. 2. The cleaning solution, the steam, and the sterile air are then introduced at periodic intervals into the supply chamber 28. They flow through the supply chamber 28, the chamber 29, the control chambers 26 and 27, the dosing chamber of the cylinder 12, the extended chamber 16, and the tubes 50 and 52 to exhaust finally through the outflow supports 55 and 56 into the outflow line 57.

What is claimed and desired to be secured by Letters Patent of the United States is:

1. A dosing device for germ-free measuring and filling of individual portions of a liquid material, comprising:

a supply chamber for the liquid material;

a filling chamber to which a measured quantity of liquid material is delivered; and a dosing pump connected to the supply chamber and the filling chamber, for delivering the measured quantity of liquid material from the supply chamber to the filling chamber, said dosing pump including:
  (i) a piston; and
  (ii) an extended chamber to allow a freeing of the piston, wherein the upper portion of the supply chamber, the extended chamber and the filling chamber are interconnected by rigidly arranged channels, and wherein the supply chamber, the extended chamber and the filling chamber are in contact with a sterile atmosphere maintained within said rigidly arranged channels.

2. The dosing device as defined in claim 1, wherein the channels are formed by rigidly arranged tubes.

3. The dosing device as defined in claim 1, wherein the dosing pump further includes:
  (iii) a further chamber connected to the upper portion of the supply chamber;
  (iv) a distributing slide valve which extends from the further chamber to the filling chamber; and
  (v) control means located at least partly within the further chamber, which transfer control movements to the distributing slide valve.

* * * * *